United States Patent
Heimann et al.

(10) Patent No.: US 9,279,513 B2
(45) Date of Patent: Mar. 8, 2016

(54) GAS VALVE

(75) Inventors: Assaf Heimann, D.N. Lachish Darom (IL); Izhar Bahir, D.N. Hof Ashkelon (IL)

(73) Assignee: DOROT MANAGEMENT CONTROL VALVES LTD., D.N. Hof Ashkelon (IL)

( * ) Notice: Subject to any disclaimer, the term of this patent is extended or adjusted under 35 U.S.C. 154(b) by 17 days.

(21) Appl. No.: 13/505,968

(22) PCT Filed: Nov. 10, 2010

(86) PCT No.: PCT/IL2010/000929
§ 371 (c)(1),
(2), (4) Date: May 3, 2012

(87) PCT Pub. No.: WO2011/058551
PCT Pub. Date: May 19, 2011

(65) Prior Publication Data
US 2012/0216879 A1 Aug. 30, 2012

Related U.S. Application Data

(60) Provisional application No. 61/260,467, filed on Nov. 12, 2009.

(51) Int. Cl.
*F16K 24/04* (2006.01)
*E03B 7/07* (2006.01)
(Continued)

(52) U.S. Cl.
CPC ............... *F16K 24/044* (2013.01); *E03B 7/075* (2013.01); *E03B 7/08* (2013.01); *E03F 5/08* (2013.01); *F16K 24/00* (2013.01); *Y10T 137/3099* (2015.04)

(58) Field of Classification Search
CPC ....... F16K 24/00; F16K 24/04; F16K 24/042; F16K 24/044; F16K 24/06; F16K 15/14; F16K 15/148; F16K 17/02; F16K 7/00; F16K 7/12; F16K 7/123; F16K 7/126; F16K 7/14; F16K 7/17; E03C 1/104; E03C 1/1225; E03B 7/07; E03B 7/071; E03B 7/075; E03B 7/077; E03B 7/078; E03B 7/08; E03F 5/08
USPC .......................................... 137/202, 217, 218
See application file for complete search history.

(56) References Cited

U.S. PATENT DOCUMENTS 3,770,001 A * 11/1973 Davis ............................ 137/217
4,243,066 A 1/1981 Lambie
(Continued)

FOREIGN PATENT DOCUMENTS

| GB | 2 306 179 A | 4/1997 |
|----|----|----|
| WO | 2008/028887 A1 | 3/2008 |
| WO | 2008/087230 A1 | 7/2008 |
| WO | 2008/101295 A1 | 8/2008 |

OTHER PUBLICATIONS

The International Search Report for International Application No. PCT/IL2010/000929, 3 pages, mailed Mar. 16, 2011.
(Continued)

*Primary Examiner* — William McCalister
*Assistant Examiner* — Ian Paquette
(74) *Attorney, Agent, or Firm* — Vorys, Sater, Seymour & Pease LLP

(57) ABSTRACT

Provided is a valve including a housing fitted with a valve coupling port being in flow communication with a gas inlet valve component and an independent gas discharge valve component. The gas inlet valve component includes a normally closed valve inlet port and an outlet barrier configured for spontaneous opening to thereby facilitate only ingress of ambient gas into the housing upon pressure drop at the valve coupling port The gas discharge valve component including a valve discharge port and a displaceable float member to thereby facilitate spontaneous egress of substantially only gas from the housing and remain closed upon presence of liquid within the housing.

20 Claims, 6 Drawing Sheets

(51) Int. Cl.
*E03B 7/08* (2006.01)
*E03F 5/08* (2006.01)
*F16K 24/00* (2006.01)

(56) References Cited

U.S. PATENT DOCUMENTS

| | | | | |
|---|---|---|---|---|
| 4,556,084 | A | | 12/1985 | Frawley |
| 5,402,818 | A | * | 4/1995 | Kasugai et al. ............... 137/198 |
| 5,511,577 | A | | 4/1996 | Richards et al. |
| 6,105,608 | A | | 8/2000 | Katzman |
| 6,158,456 | A | * | 12/2000 | Enge ............................ 137/202 |
| 7,866,334 | B2 | | 1/2011 | McIntire |
| 2003/0079775 | A1 | * | 5/2003 | Ehrman et al. ................ 137/202 |
| 2008/0276994 | A1 | * | 11/2008 | Goetzinger et al. .......... 137/218 |

OTHER PUBLICATIONS

"Air Valves Providing System Efficiency and Protection", Bulletin 1500, by Val-Matic, 28 pages; (c) 2008; available online at: http://www.valmatic.com/brochures/Air_1500.pdf.

"Combination Anti-Freeze Air Valve for Raw Water. 400mm", designated "D-133 PN 10", edition "ED133-07" from 2007, by A.R.I. Flow Control Accessories, 3 pages.

"Combination Vacuum Relief & Air Release Valve", pp. 59 and 60; Combination Air Valves, by GA Industries Inc.; 24 total pages; available online from Mar. 27, 2009 at http://www.web.archive.org/web/2009040817062/http://www.gainindustries.com/Products1/DataSheets/993DS.pdf (p. 60) and http://www.web.archive.org/web/2009040817062/http://www.gainindustries.com/Productsl/DataSheets/992DS.pdf (p. 59).

* cited by examiner

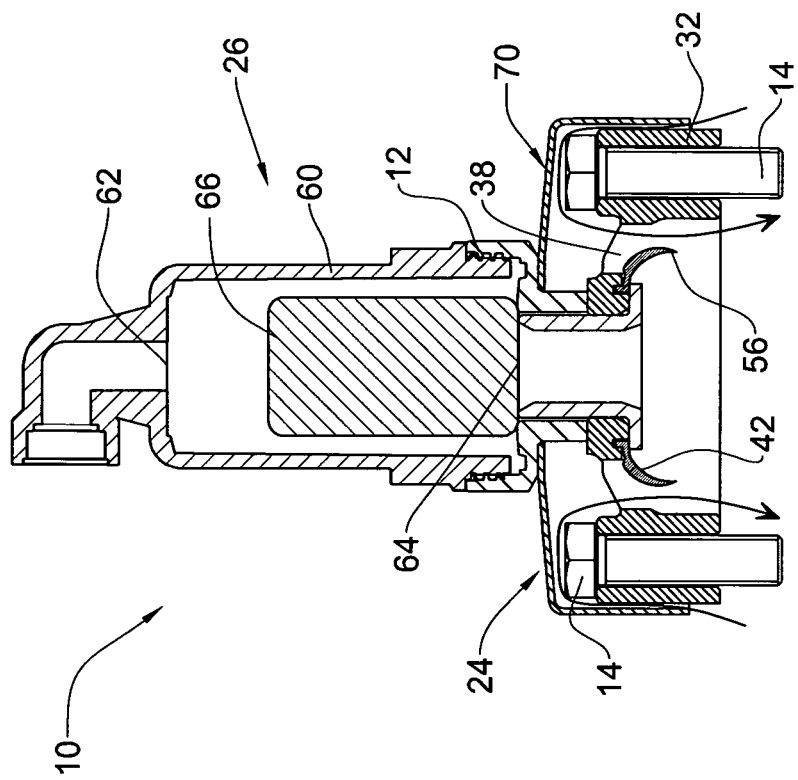
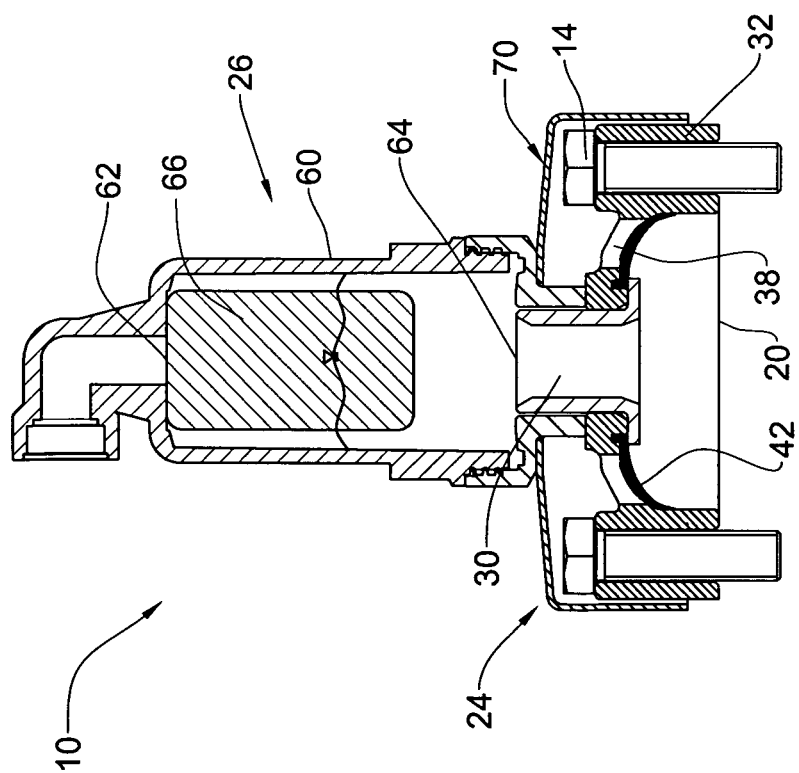

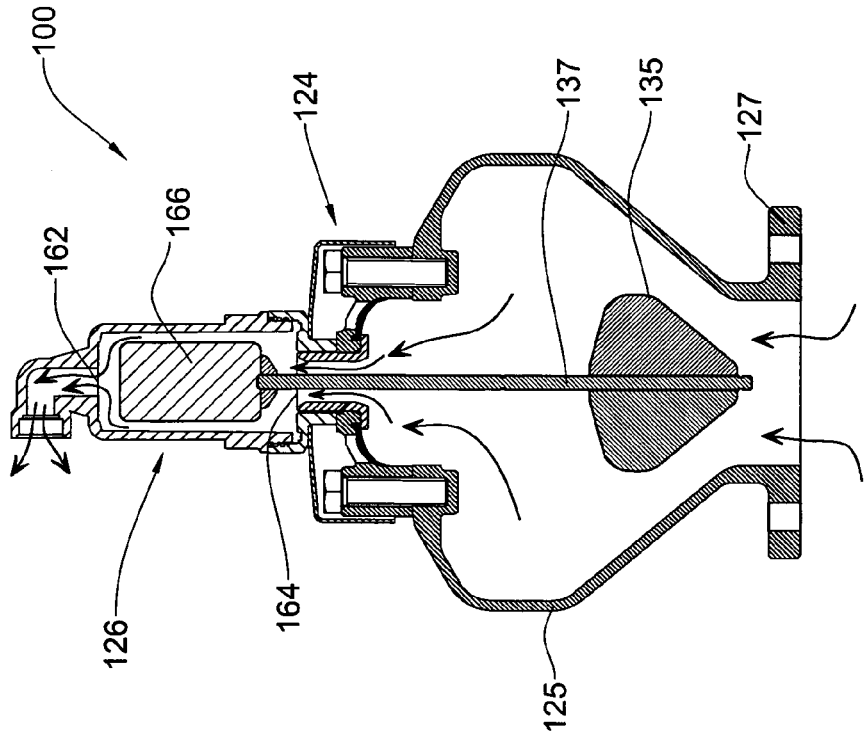
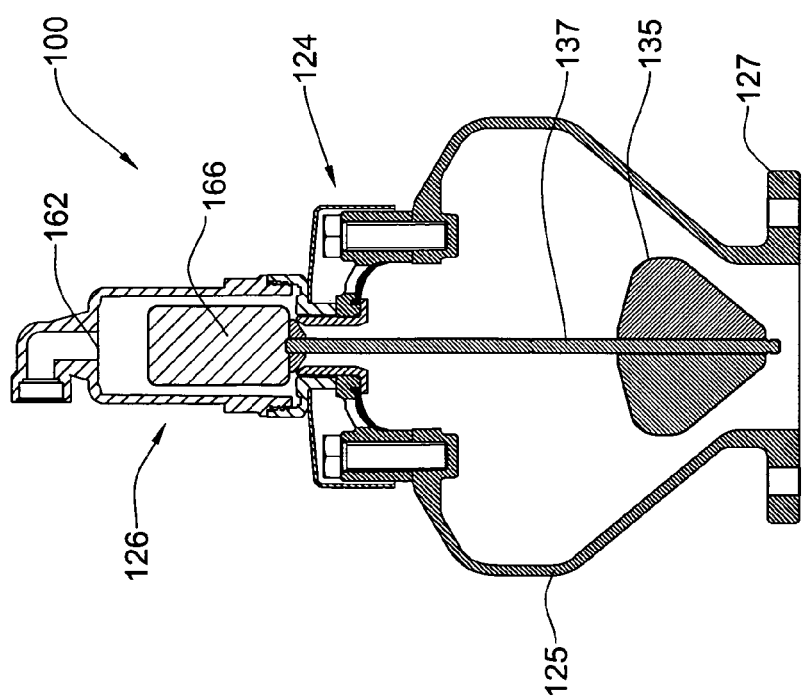
Fig. 2A
Fig. 2B

GAS VALVE

This is a National Phase Application filed under 35 U.S.C. §371 as a national stage of PCT/IL2010/000929, filed on Nov. 10, 2010, an application claiming the benefit under 35 U.S.C. §119(e) of U.S. Provisional Application No. 61/260,467, filed on Nov. 12, 2009, the content of each of which is hereby incorporated by reference in their entirety.

FIELD OF THE INVENTION

This invention relates to valves of the type commonly fitted in liquid supply systems. More particularly the invention is directed to a combined anti-vacuum/gas-release valve.

BACKGROUND OF THE INVENTION

Gas valves are designed to be installed in liquid flow systems such as, for example, water main distribution lines or sewage collection systems, or liquid tanks, and are intended to discharge air (typically in water supply systems) or other gasses (e.g. in sewage systems), thus avoiding the formation and accumulation of gas pockets and bubbles which interfere with the liquid flow and which can also damage accessories and components fitted to the liquid system, and are designed to allow ambient atmospheric air into the system so to avoid the risk of contamination and possible pipeline and tanks collapse under internal sub-atmospheric pressure, when the system is drained from fluid.

A requirement for such gas valves is their ability to discharge effectively both large and small quantities of gas from a liquid system whilst, at the same time, being or becoming sealed against liquid discharge from the system. Conventional air purge valves are formed with a gas discharge outlet through which the gasses are discharged but which become sealed against liquid discharge by a float located in a valve housing and which becomes pressed against the outlet so as to seal it with a rising level of liquid in the valve housing.

Yet another requirement of a gas valve of the concerned type is to facilitate ambient gas ingress into the liquid system. This may be required for example, upon rapid discharge of the liquid system (e.g. at the event of deliberate draining or burst of a pie line, etc.). Thus, such valves should be suited for admitting ingress of ambient air at atmospheric pressure into the system at the occurrence of negative pressure (vacuum) within the liquid system. However, upon pressure re-built within the system, i.e. upon refilling, the inlet valve should reseal to prevent liquid egress from the system

SUMMARY OF THE INVENTION

The hereinafter disclosed subject matter is concerned with a valve comprising a housing fitted with a valve coupling port being in flow communication with a gas inlet valve component and an independent gas discharge valve component; said gas inlet valve component comprising a normally closed valve inlet port and an outlet barrier configured for spontaneous opening to thereby facilitate only ingress of ambient gas into the housing upon pressure drop at the valve coupling port; said gas discharge valve component comprising a valve discharge port and a displaceable float member to thereby facilitate spontaneous egress of substantially only gas from the housing and remain closed upon presence of liquid within the housing.

The present disclosure is further concerned with a liquid system fitted with a valve of the aforementioned type.

The valve according to the disclosed subject matter is configured for mounting on a liquid supply pipe such as, for example, a water supply mains, a sewage line (or other device e.g. liquid tank, etc.), etc., the arrangement being such that at the normal course of operation, i.e. at the existence of liquid at a pressure higher than the atmospheric pressure in the system, the valve attached thereto remains at a substantially closed/sealed position, namely on the one hand prevents ingress of ambient air into the pipe and on the other hand prevents egress of liquid from the pipe. However, at the instance of a gas pocket arriving at the valve it will be substantially discharged and the valve will spontaneously seal again upon discharging the gas and arrival of liquid into the valve housing, to prevent liquid egress therethrough. On the other hand, at the event of pressure drop within the system (vacuum) and consequentially in the valve's housing, the valve will facilitate ambient air ingress, to thereby prevent collapse of the pipe system and/or components articulated thereto. However, upon pressure buildup within the housing, the valve will spontaneously displace into its sealed position to prevent liquid egress therethrough.

Any one or more of the following features and designs may be incorporated in a valve according t the disclosed subject matter:

The valve inlet port is configured with a plurality of radially extending oblong apertures, said apertures being normally sealed by virtue of an outlet barrier.

The gas inlet port is normally closed by a flexible diaphragm, said diaphragm being centrally supported within the housing.

The flexible diaphragm is configured with a fine peripheral edge to facilitate sealing engagement with an annular sealing wall of the housing.

The housing comprises an extension chamber for coupling to a sewage line system, wherein the float member is articulated through a rigid coupling rod with a sewage float extending within said extension chamber, wherein displacement of one float entails corresponding displacement of the other float.

The coupling rod extends through a tubular portion of the inlet port, sealingly engageable by the float member; said tubular portion supporting a flexible diaphragm configured for normally closing the gas inlet port.

The valve is configured for facilitating discharge of substantially large volume of gas through an outlet port so as to purge gas from the sewage line.

The sewage float is configured with rounded surfaces to prevent accumulation of dirt thereon.

The housing is configured with a normally closed gas inlet valve component and a separate gas discharge valve component.

BRIEF DESCRIPTION OF THE DRAWINGS

In order to understand the disclosed subject matter and to see how it may be carried out in practice, embodiments will now be described, by way of non-limiting examples only, with reference to the accompanying drawings, in which:

FIG. 1C illustrates the valve of FIG. 1A at a shut-off position upon liquid level rise within the valve;

FIG. 1D illustrates the valve of FIG. 1A at a so-called air inlet position

FIG. 2A is a longitudinal section of sewage system valve according to another example of the disclosed subject matter, at a so-called stand-still position;

FIG. 2B illustrates the valve of FIG. 2A at a so-called air discharging position;

FIGS. 3D and 3F are enlarged top and longitudinal sectioned views, respectively, of the portion marked III in FIG. 3B, at the open position of inlet valve diaphragm.

DETAILED DESCRIPTION OF EMBODIMENTS

Figure 1A:
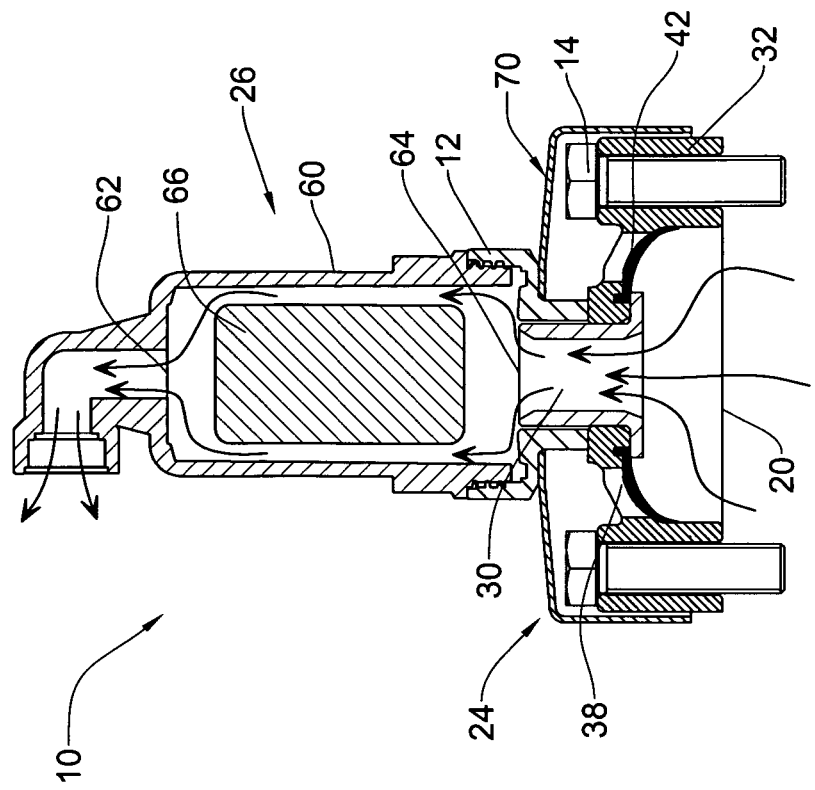
FIG. 1A is a longitudinal section of valve according to a first example of the disclosed subject matter, at a stand-still position.

Attention is first directed to FIGS. 1A-1D of the drawings directed to a first example of a valve in accordance with the present disclosed subject matter, generally designated 10.

The valve 10 is suited for mounting on a liquid supply line (not shown) such as a water mains supply and the like, or in any other liquid supply component such as, for example, liquid reservoirs and the like.

The valve 10 comprises a housing 12 fitted for securing to a flanged portion of the liquid system (not shown) by means of bolts 14, in a fluid-type manner.

The housing 12 is fitted with a valve coupling port 20 extending over an appropriate aperture of the liquid supply system.

The valve 10 comprises a gas inlet valve component generally designated 24, and an independent gas discharge valve component generally designated 26. The gas inlet valve component 24 is in direct flow communication with the valve coupling port 20 whilst the gas discharge valve component 26 is in flow communication with the valve coupling port 20 via a conduit portion 30.

The gas inlet valve component 24 comprises a housing structure 32 (seen also in FIGS. 3A-3F) formed with four bolt receiving apertures 36 and a plurality of radially extending oblong apertures 38 constituting a valve inlet port which is normally sealed by virtue of an outlet barrier in the form of a flexible diaphragm which in the present example is retained in place by a tubular component 46 clamping a tubular section 48 of the diaphragm 42 thus fixing it to a hub portion 50 of the structure 32. As can best be seen in FIGS. 3D and 3F, the diaphragm 42 is formed adjacent the section 48 with an annular groove 52 thereby constituting a weakened zone thereof facilitating deformation of the diaphragm 42 about said weakened zone. Further notice, the diaphragm 42 terminates at a substantially fine free edge 56 which at the sealed position of FIG. 3F sealingly bears against an annular sealing wall portion 58 of the structure 32.

Figure 3E:
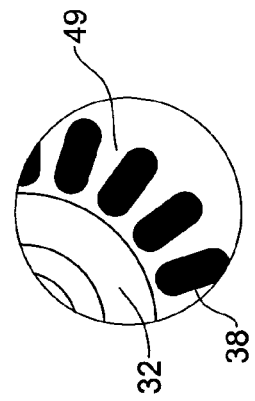
Figure 3F:
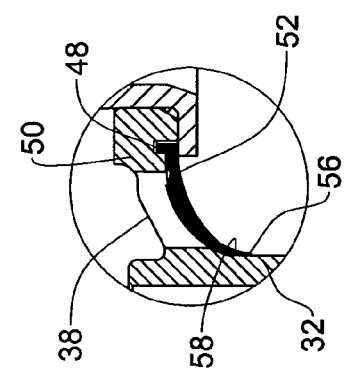
Figure 3C:
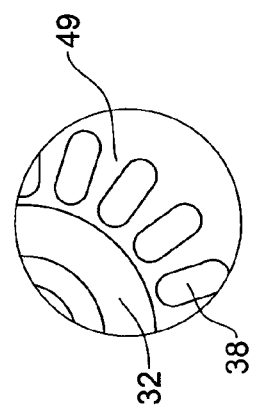
FIGS. 3C and 3D are enlarged top and longitudinal sectioned views, respectively, of the portion marked III in FIG. 3B, at the closed position of inlet valve diaphragm.
Figure 3D:
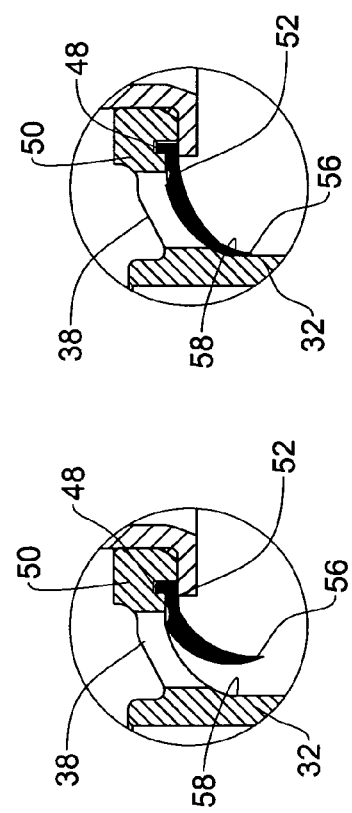
Figure 3A:
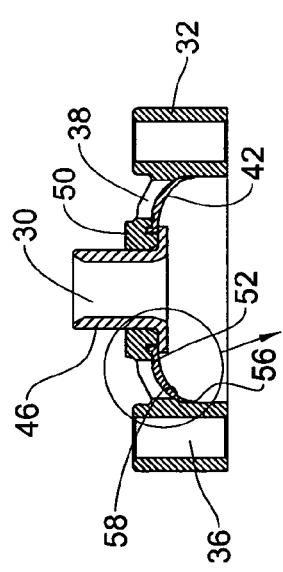
FIG. 3A is a longitudinal of only an inlet component of the valves illustrated in the examples of FIGS. 1 and 2.
Figure 3B:
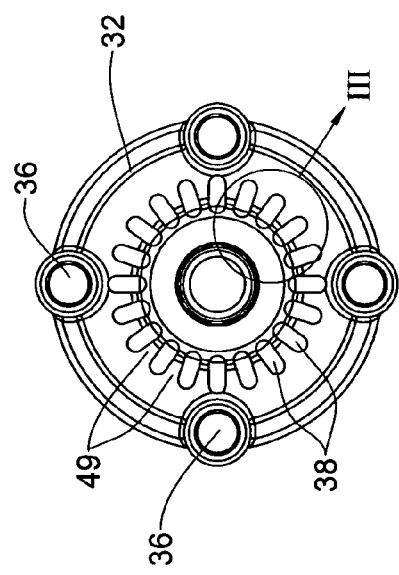
FIG. 3B is a top view of the inlet component of the valves illustrated in the examples of FIGS. 1 and 2.

The diaphragm 42, at its closed position (as illustrated in FIG. 3F) sealingly bears against the section 50 and the wall portions 49 extending between the adjoining apertures 38.

Reverting now to the gas discharge valve component 26 it comprises a cylindrical housing component 60 formed with a discharge outlet port 62 and an inlet port 64 being in flow communication via port 30 to the valve coupling port 20. Axially displaceable within the housing 60 there is a float member 66 displaceable between an inlet position (FIG. 1A) wherein it rests over the inlet port 64, and an outlet sealing position (FIG. 1C) wherein the float member 66 is biased upwardly in virtue of a liquid rising within the casing 60 sealing the outlet 62. The gas discharge valve component 26 is at its closed position upon and as long as liquid occupies the housing 60. According to a particular design, the float member sealingly engages the inlet port 64 at its lowermost position of FIG. 1D.

It should be noted that the fine edges 56 of the deformable sealing diaphragm 42 are designed for sealing engagement with the annular side wall 58, the arrangement being such that negative pressure at the valve coupling port 20 (creation of vacuum within the liquid supply line) will result in deformation of the diaphragm 42 into its open position (FIG. 1D). However, under normal operation conditions, at the presence of pressure within the supply line, the flexible diaphragm 42 remains at its closed position biased under pressure against the ribs 49 and against the side wall 58. The substantially fine (thin) diametric edge 56 of the diaphragm 42 ensures tight sealing against the wall 58, also the presence of dirt such as debris, sand, etc.

It is further noted that the gas inlet valve component 24 is configured with a protective cap 70 to prevent ingress of dirt and insects into the system (in virtue of vacuum at the position of FIG. 1D). Likewise, the discharge port 62 may be fitted with a deflection cap and cover/screen (not shown) to prevent dirt and insects from entering the system and further, to deflect small amounts of liquid which may splash at the instance of sealing of the float member.

In the present example, the gas inlet valve component 24 and the gas discharge valve component 26 are integrated by screw coupling to one another at the tubular component 46. However, according to a different example (not shown), the gas inlet valve component 24 and the gas discharge valve component 26 may be integrally manufactured as a unitary housing.

It is appreciated that the valve inlet port 38 remains at its normally closed position (FIGS. 1A-1C) as long as the pressure at the valve coupling port 20 (i.e. within the liquid system) equals ambient pressure, however, the diaphragm 42 will spontaneously deform to provide a large sectioned inlet flow path through the valve inlet port 38.

The valve 10 illustrated in FIGS. 1A to 1D functions in several modes, independent of one another, as follows:

Rest Mode

This position, as illustrated in FIG. 1A, represents a position wherein the gas inlet valve component 24 is at its normally closed position and the gas discharge valve component 26 is open. This position may occur when the valve is disconnected from a liquid supply system or when the system is completely drained from water and its internal pressure is equal to the atmospheric (ambient) pressure.

Gas Discharge Position

Figure 1B:
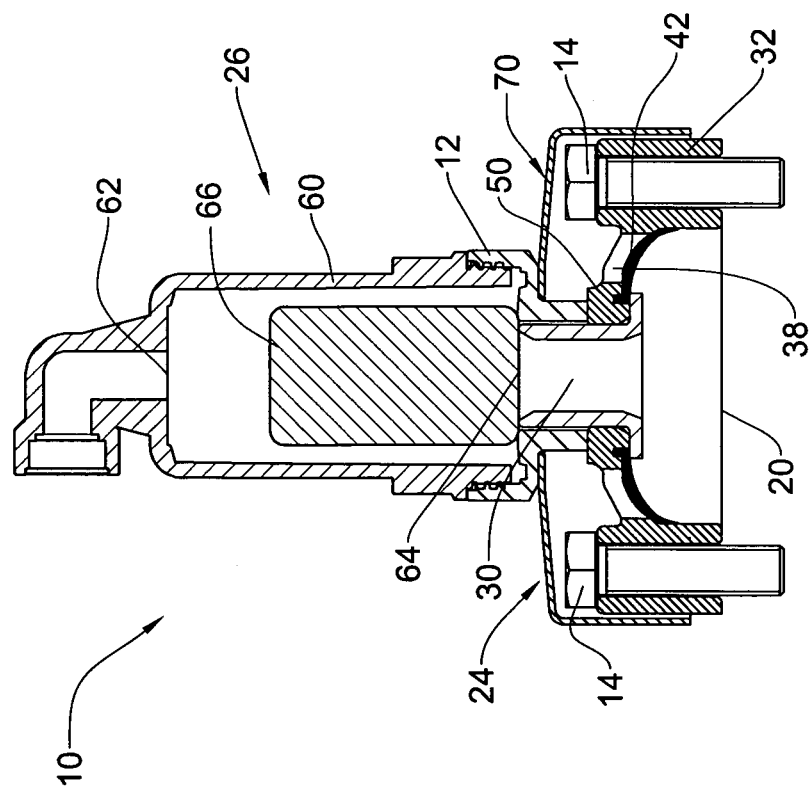
FIG. 1B illustrates the valve of FIG. 1A at a so-called air discharging position.
Figure 2C:
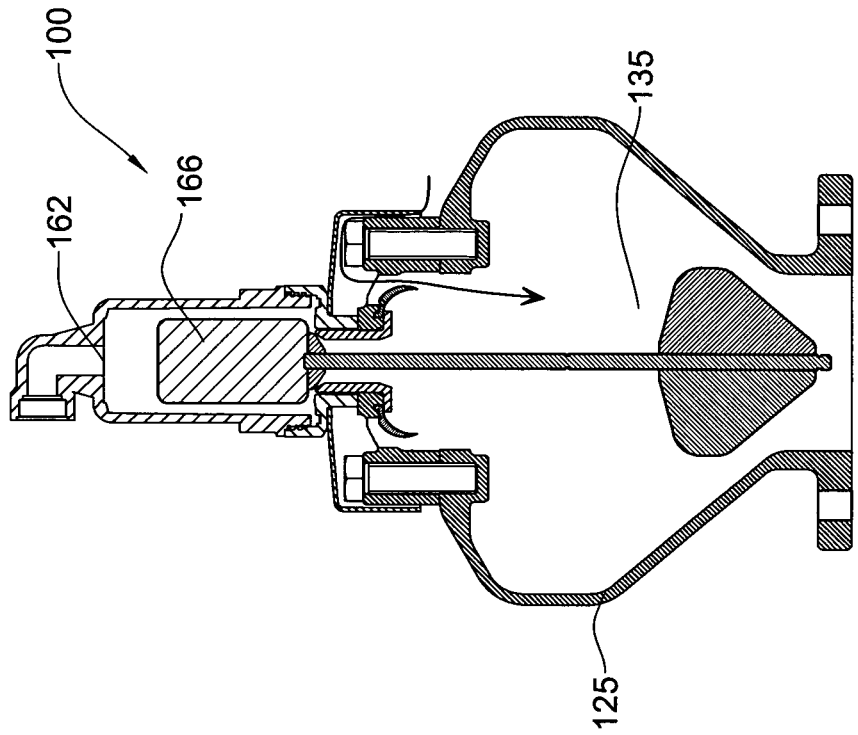
FIG. 2C illustrates the valve of FIG. 2A at a shut-off position upon liquid level rise within the valve.
Figure 2D:
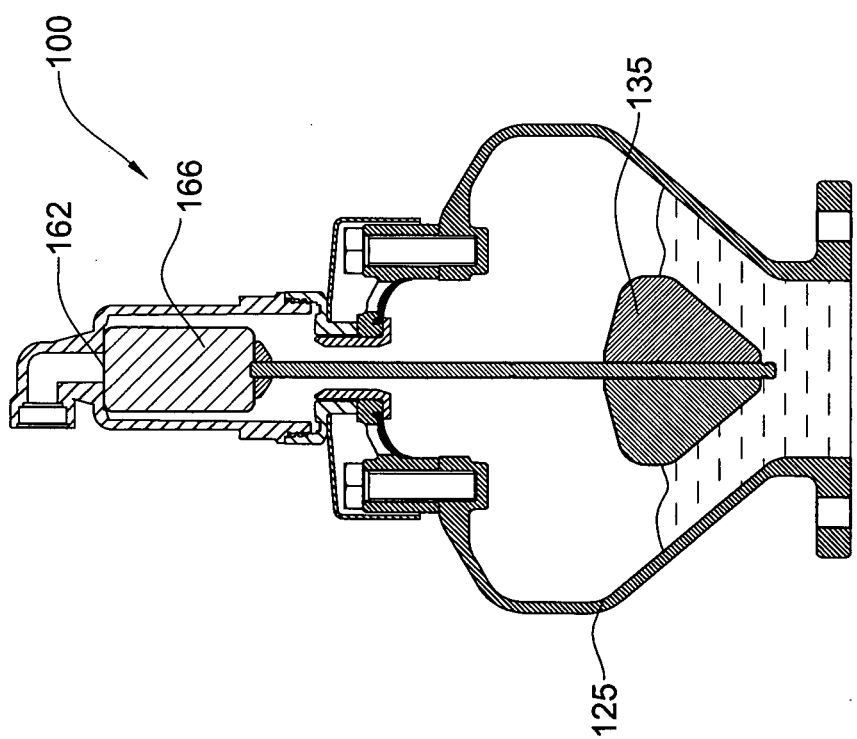
FIG. 2D illustrates the valve of FIG. 1A at a so-called air inlet position

This position, as represented in FIG. 1B, illustrates a situation whereupon the liquid supply line is filled with liquid, giving rise to large amount of gas discharge from the system wherein the float member 66 partially rises from its inlet port 64, however the discharge port 62 remains open to facilitate discharge of large amount of gas through the outlet port.

Discharge Port Sealed

This position, as represented in FIG. 1C, occurs upon liquid level rising within the gas discharge valve housing 60 into a position wherein substantially all the gas has purged from the liquid system and in order to prevent liquid escaping through the outlet port 62.

Gas Inlet Position

This position, as represented in FIG. 1D, occurs upon sudden drainage of the liquid system wherein in order to prevent buckling of the piping and associated equipment, the diaphragm 42 deforms into the position of FIG. 1D to facilitate ingress of large volume of ambient air through the apertures 38. This position occurs under vacuum i.e. lower pressure within the liquid system than at the ambience.

Further attention is now directed to FIGS. 2A to 2D representing a further example of a valve in accordance with the present invention generally designated 100 and wherein like elements already disclosed in connection with the example of FIGS. 1A to 1D are designated with same reference numbers, however shifted by 100.

The valve 100 is of the type fitted on a sewage mains line and is composed of three principle components, namely a gas inlet valve component generally designated 124 integrated with an independent gas discharge valve component generally designated 126, wherein the gas inlet valve component 124 is mounted on a extension housing unit 125 fitted with a flanged portion 127 for coupling to the sewage mains (not shown).

In fact, the gas inlet valve component 124 is identical with the corresponding gas inlet valve component 24 of the example of FIGS. 1A to 1D and likewise, the independent gas discharge valve component 126 is identical with the structure of the gas discharge valve component 26 of example illustrated in FIGS. 1A to 1D with the exception that the float member 166 is fitted at its bottom end with a sewage float 135 articulated to the float member 166 by an elongate rod 137, said sewage float 135 extending within the extension chamber 125.

The valve 100 operates in the same manner as discussed in connection with the previous example, with the difference residing in the position of the sewage float 135 wherein at the gas discharge position (FIG. 2B) a large amount of gas is discharged from the system wherein the float member 166 with the associated sewage float 135 partly raise from the inlet port 164 to facilitate discharging of a large volume of gas through the outlet port 162, thus draining air from the sewage system e.g. upon filling of the line and upon generation of gas pockets in the sewage system.

However, upon entry of liquid into the housing 125 (FIG. 2C) the sewage float 135 is urged, under buoyancy forces, upwards, entailing corresponding upwards displacement of the float member 166 into sealing engagement of the discharge port 162, thus preventing liquid discharge therethrough. This arrangement eliminates or significantly reduces dirt within the liquid system from encountering the gas inlet valve component 124 and the gas discharge valve component 126, to maintain their operation.

Turning now to FIGS. 4 to 6 there are schematic illustrations of several examples of modifications of the disclosed subject matter.

Figures 4A, 4B:
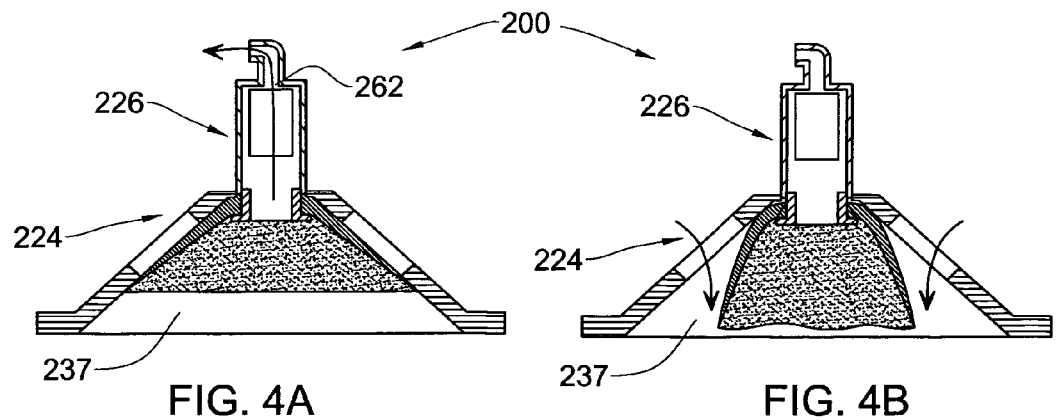
FIGS. 4 to 6 are schematic sectioned views of a valve according to still another example of a valve according to the present disclosed subject matter, each example illustrated at the so called closed and inlet position thereof, respectively.

In the example of FIGS. 4A and 4B the valve assembly 200 comprises a gas inlet valve component generally designated 224, and an independent gas discharge valve component generally designated 226, acting similar to the disclosure of the example illustrated in FIGS. 1A to 1D, however with a compact structure.

In FIG. 4A the gas inlet valve component 224 is at its so called closed position under the existence of pressure within the chamber 237 of the valve assembly. However, in FIG. 4A the gas discharge valve component generally designated 226 is in its so called open i.e. discharging position, namely discharging gas from the chamber 237 to the surroundings via the outlet port 362. In FIG. 4B the gas inlet valve component 224 is at its open position (under pressure drop at the chamber 237), resulting in ingress of ambient gas into the chamber and into the liquid system articulated thereto.

Figures 5A, 5B:
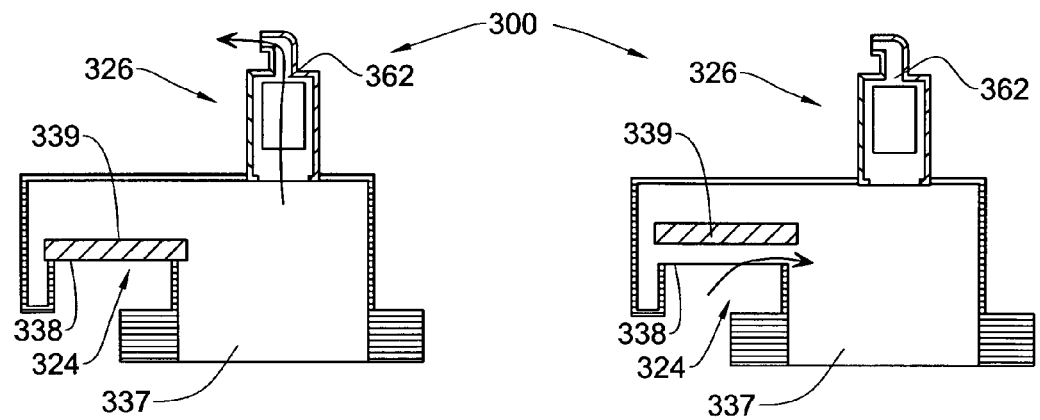

FIGS. 5A and 5B illustrate a valve assembly 300 comprises a gas inlet valve component generally designated 324, and an independent gas discharge valve component generally designated 326, wherein the gas discharge valve component 326 is of the type disclosed hereinabove, whilst the gas inlet valve component 324 comprises an inlet aperture 338 which is normally sealed by a sealing member 339 in the form of a sealing disc displaceable between a normally sealed position (FIG. 5A) and a temporarily open position (FIG. 5B). The sealing disc 339 is biased into its normally sealed position under force of gravity and if desired a biasing member (not shown) may be provided, for controlling a threshold pressure for opening, i.e. displacing the disc 339 into its open position of FIG. 5B, under vacuumed at the chamber 337.

In FIG. 5A the gas inlet valve component 324 is at its so called closed position under the existence of pressure within the chamber 337 of the valve assembly.

However, in FIG. 5A the gas discharge valve component generally designated 326 is in its so called open i.e. discharging position, namely discharging gas from the chamber 337 to the surroundings via the outlet port 362. In FIG. 5B the gas inlet valve component 324 is at its open position (under pressure drop at the chamber 337), resulting in ingress of ambient gas into the chamber and into the liquid system articulated thereto.

Figures 6A, 6B:
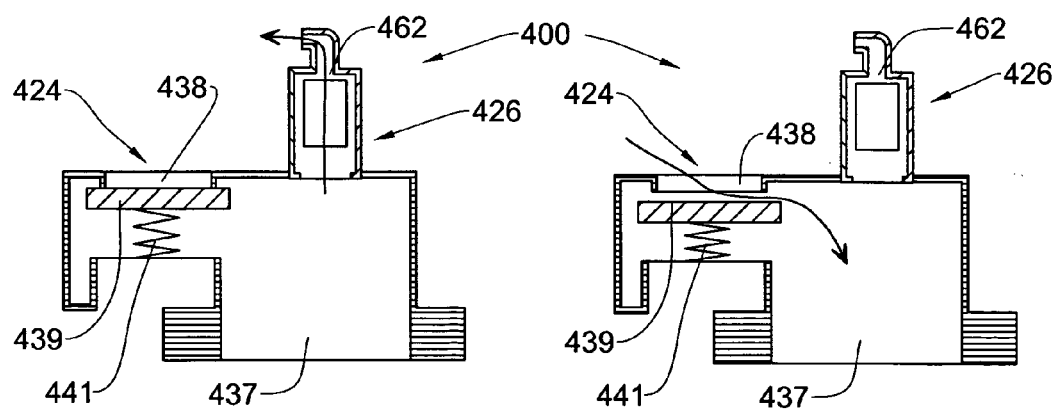

Turning now to the example illustrated in FIGS. 6A and 6B there is a valve assembly generally designated 400 comprising a gas inlet valve component generally designated 424, and an independent gas discharge valve component generally designated 426, wherein the gas discharge valve component 426 is of the type disclosed hereinabove, whilst the gas inlet valve component 424 comprises an inlet aperture 438 which is normally sealed by a sealing member 439 in the form of a sealing disc displaceable between a normally sealed position (FIG. 6A) and a temporarily open position (FIG. 6B). The sealing disc 439 is biased into its normally sealed position by a biasing spring 441, where force applied by the spring may govern the threshold pressure for opening, i.e. displacing the disc 439 into its open position of FIG. 6B, under vacuum at the chamber 439).

In FIG. 6A the gas inlet valve component 424 is at its so called closed position under the existence of pressure within the chamber 437 of the valve assembly. However, in FIG. 6A the gas discharge valve component generally designated 426 is in its so called open i.e. discharging position, namely discharging gas from the chamber 437 to the surroundings via the outlet port 462. In FIG. 6B the gas inlet valve component 424 is at its open position (under pressure drop at the chamber 437), resulting in ingress of ambient gas into the chamber and into the liquid system articulated thereto.

Those skilled in the art to which this disclosed subject matter pertains will readily appreciate that numerous changes, variations, and modifications can be made without departing from the scope of the disclosed subject matter. Mutatis Mutandis.

For example, the gas discharge valve component may be any selected type of gas discharge valve, e.g. an automatic gas discharge valve segment urge valve.

The invention claimed is:

1. A gas valve for mounting on a liquid supply line, the gas valve comprising:

a gas inlet valve comprising
  a gas inlet valve housing configured for connecting to the liquid supply line, the gas inlet valve housing comprising a first conduit portion in fluid communication with a second conduit portion, the gas inlet valve housing comprising one or more apertures extending from an interior of the first conduit portion to an exterior of the gas inlet valve housing for admitting ambient gas from the atmosphere into the interior of the first conduit portion and the liquid supply line when the one or more apertures are unsealed, and
  a diaphragm connected to and extending outwardly from the second conduit portion and sealingly engaging with an interior annular side wall of the first conduit portion, the diaphragm being configured to normally seal the one or more apertures when the gas inlet valve is in a closed position and unseal and open the one or more apertures to thereby facilitate ingress of ambient gas from the atmosphere into the interior of the first conduit portion and the liquid supply line upon pressure drop in the liquid supply line; and
an independent gas discharge valve connected to the gas inlet valve housing, the independent gas discharge valve comprising
  a gas discharge valve housing connected to the second conduit portion of the gas inlet valve and having a gas outlet port; and
  a displaceable float member sealingly engaging an upper end of the second conduit portion of the gas inlet valve when in a lower position and sealingly engaging the outlet port of the independent gas discharge valve when in an upper position, the independent gas discharge valve configured to facilitate egress of gas from the gas inlet valve and close upon presence of liquid entering the independent gas discharge valve and raising the float member to the upper position.

2. The valve according to claim 1, wherein the valve is configured so that when pressure within the housing is higher than atmospheric pressure, the valve remains at a substantially closed position, so as to prevent ingress of ambient air into the housing and to prevent egress of liquid through the housing, wherein the valve is configured so that upon a gas pocket arriving at the valve it will be substantially discharged from the housing and the valve will spontaneously seal upon discharging the gas and arrival of liquid into the valve housing, to prevent liquid egress therethrough, in the event of a pressure drop within the housing, the valve will facilitate ambient air ingress into the housing and upon pressure buildup within the housing, the valve will spontaneously displace into its closed position to prevent liquid egress therethrough.

3. The valve according to claim 1, wherein the housing is configured with the gas inlet valve normally closed and the gas discharge valve being separate from the gas inlet valve.

4. The valve according to claim 1, wherein the valve is configured so that the normally closed valve can be open along with the inlet port.

5. The gas valve according to claim 1, wherein the diaphragm comprises fine edges for sealing enagement with the annular side wall.

6. The valve according to claim 1, wherein the independent gas discharge valve is fitted on top of the gas inlet valve.

7. The gas valve according to claim 1, wherein the diaphragm is configured so that one side of the diaphragm contacts a housing surface surrounding each one or more apertures to seal a perimeter edge of each one or more apertures.

8. The gas valve according to claim 7, wherein the housing of the gas inlet valve comprises multiple apertures separated by ribs cooperating with the diaphragm.

9. The gas valve according to claim 1, further comprising a protective cap fitting over the housing of the gas inlet valve, the protective cap configured to provide fluid communication between the one or more apertures and the atmosphere.

10. The gas valve according to claim 9, wherein a spacing is provided between at least a portion of an outer side wall of the housing of the gas inlet valve and at least a portion of an inner side wall of the protective cap to provide a fluid passageway.

11. The valve according to claim 1, wherein the housing comprises an extension chamber for coupling to a sewage line system, wherein the float member is articulated through a rigid coupling rod with a sewage float extending within said extension chamber, wherein displacement of one float entails corresponding displacement of the other float.

12. The valve according to claim 11, wherein the coupling rod extends through a tubular portion of the inlet port, the inlet port being sealingly engageable by the float member, said outlet barrier being a flexible diaphragm, said tubular portion supporting the flexible diaphragm configured for closing the gas inlet port.

13. The valve according to claim 11, configured for facilitating discharge of substantially large volume of gas through an outlet port so as to purge gas from the sewage line.

14. The valve according to claim 11, wherein the sewage float is configured with rounded surfaces to prevent accumulation of dirt thereon.

15. The valve according to claim 1, wherein the valve inlet port is configured with a plurality of radially extending oblong apertures, said apertures being normally sealed by the outlet barrier.

16. The valve according to claim 15, wherein the flow cross-sectional area size comprises a sum of flow cross-sectional area sizes of each radially extending oblong aperture.

17. The valve according to claim 15, wherein the gas inlet port is closed by a flexible diaphragm, said diaphragm being centrally supported within the housing.

18. The valve according to claim 17, wherein the flexible diaphragm is configured with a peripheral edge configured to facilitate sealing engagement with an annular sealing wall of the housing.

19. A gas valve for mounting on a liquid supply line, the gas valve comprising:
  a gas inlet valve comprising
    a gas inlet valve housing configured to connect to the liquid supply line, the gas inlet valve housing comprising a first conduit portion in fluid communication with a second conduit portion, the gas inlet valve housing comprising one or more apertures extending from an interior of the first conduit portion to an exterior of the gas inlet valve housing for admitting ambient gas from the atmosphere into the liquid supply line when the one or more apertures are unsealed, and
    a diaphragm connected to and extending outwardly from the second conduit portion and sealingly engaging with the first conduit portion, the diaphragm being configured to normally seal the one or more apertures when the gas inlet valve is in a closed position and unseal and open the one or more apertures to thereby facilitate ingress of ambient gas from the atmosphere into the interior of the first conduit portion and liquid supply line upon a pressure drop in liquid supply line; and an independent gas discharge valve connected to the gas inlet valve and in fluid communication with the gas inlet valve, the independent gas discharge valve comprising a gas discharge valve housing connected to and located above the gas inlet valve housing and having a gas outlet port, and a displaceable float member sealing engaging an upper end of the second conduit portion of the gas inlet valve when in a lower position and sealing engaging the outlet port of the independent gas discharge valve housing when in an upper position, the independent gas discharge valve configured to facilitate egress of gas from the gas inlet valve and remain closed upon liquid entering the independent gas discharge valve and raising the float member to the upper position.

20. A gas valve for mounting on a liquid supply line, the gas valve comprising:

a gas inlet valve comprising a gas inlet valve housing configured for connecting to the liquid supply line, the gas inlet valve housing comprising a first conduit portion in fluid communication with a second conduit portion, the gas inlet valve housing comprising one or more apertures extending from an interior of the first conduit portion to an exterior of the gas inlet valve housing for admitting ambient gas from the atmosphere into the interior of the first conduit portion and the liquid supply line when the one or more apertures are unsealed, and a diaphragm connected to and extending outwardly from the second conduit portion and sealingly engaging with an interior annular side wall of the first conduit portion, the diaphragm being configured to normally seal the one or more apertures when the gas inlet valve is in a closed position and unseal and open the one or more apertures to thereby facilitate ingress of ambient gas from the atmosphere into the interior of the first conduit portion and the liquid supply line upon pressure drop in the liquid supply line; and a gas discharge valve fitted on top of the gas inlet valve housing, the gas discharge valve comprising a gas discharge valve housing connected to an upper portion of the second conduit portion of the gas inlet valve and having a gas outlet port; and a displaceable float member sealingly engaging an upper end of the second conduit portion of the gas inlet valve when in a lower position and sealingly engaging the outlet port of the independent gas discharge valve when in an upper position, the independent gas discharge valve configured to facilitate egress of gas from the gas inlet valve and close upon presence of liquid entering the independent gas discharge valve and raising the float member to the upper position.

* * * * *